Aug. 5, 1930.   C. H. HENNINGS   1,772,003
CAGE
Filed Jan. 16, 1930
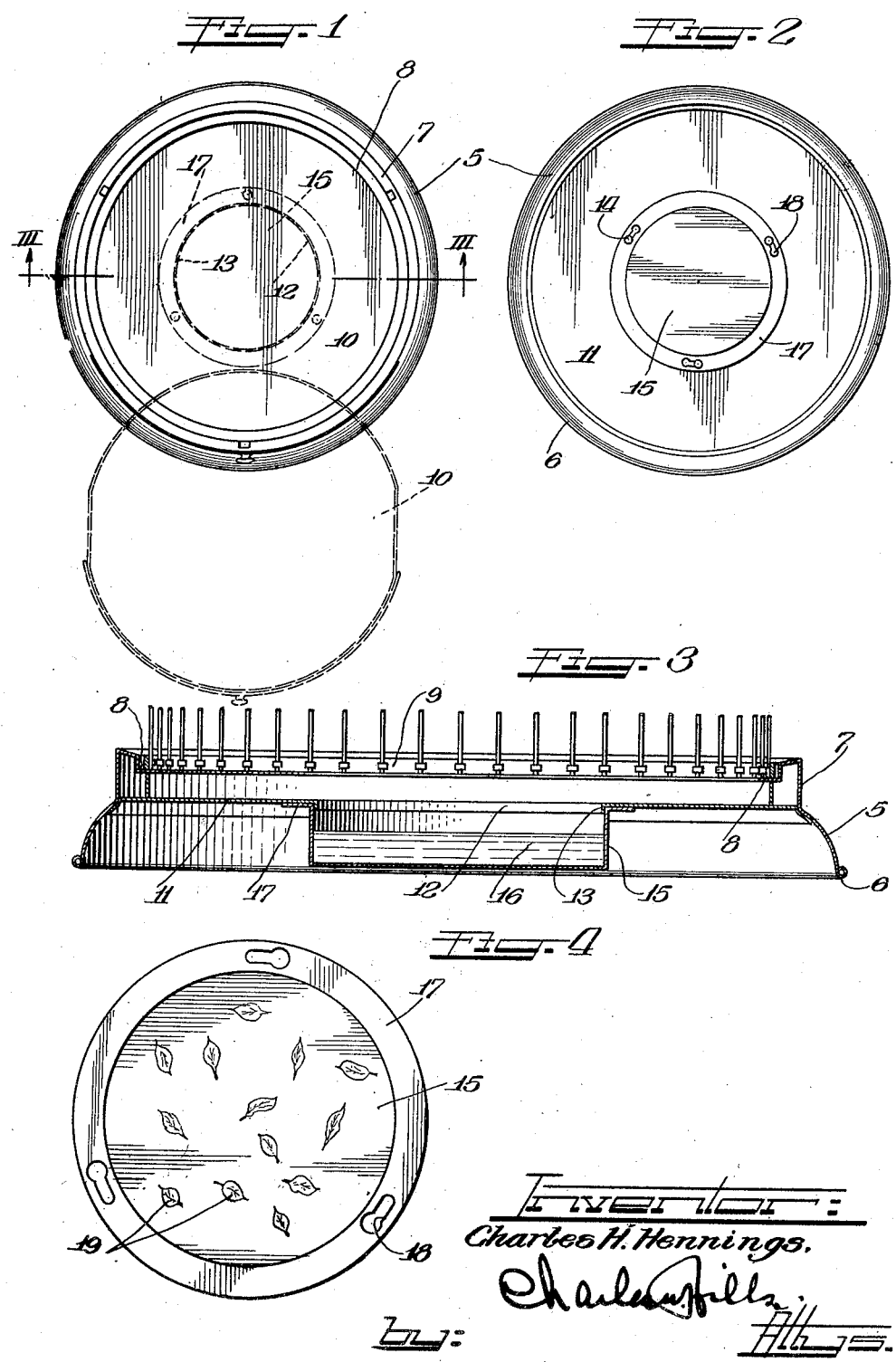
Inventor:
Charles H. Hennings.
by Patented Aug. 5, 1930

1,772,003

UNITED STATES PATENT OFFICE

CHARLES H. HENNINGS, OF CHICAGO, ILLINOIS, ASSIGNOR TO HENNINGS MANUFACTURING CO., A CORPORATION OF ILLINOIS

CAGE

Application filed January 16, 1930. Serial No. 421,107.

This invention relates to improvements in cages, and more particularly to improved means for supplying bathing facilities for the occupant of the cage, the invention being highly desirable for use in connection with bird cages and the like, although the invention may have many and various uses as will be apparent to one skilled in the art.

In the past, many and various expedients have been adopted for providing the occupant of a cage, and especially in connection with bird cages, with bathing facilities. In some instances, bird cages were provided with bathtubs built therein, while in other instances, bathtubs were placed within the cage through the door thereof whenever it was deemed fit to permit the occupant of the cage to bathe. In still other instances, it was quite common practice to place the bathtub upon a table, sink, or the like, remove the base from the bird cage, and set the body of the cage with the bird therein over top of the bathtub. In all of these methods, material objections were found. For instance, with the bathtubs built in the cage, the bird at its pleasure could internally splatter the cage with water and débris, thereby adding materially to the difficulties in keeping the cage presentable; and to place a bathtub within the cage or to place the cage body over the bathtub involves an objectionable amount of time and labor.

The present invention has been designed to overcome the above noted as well as other defects and objections in the provision of a bird cage equipped with a bathtub in such a manner that the bathtub may be easily mounted on and removed from an external portion of the cage and still be accessible from the interior of the cage.

The invention also seeks the provision of a bird cage having a removable drawer bottom and a bathtub attachable to the floor beneath said drawer, whereby the removal of the drawer will render the bathtub accessible to the occupant of the cage.

Another object of the present invention is to provide a bird cage to which a bathtub may be attached in such a manner that the bathtub will be invisible when the cage is in its normal useful position.

Still another object of this invention is the provision of a cage to which a bathtub may be attached and left accessible to the occupant of the cage for as long a period as is desired without interfering in any manner with the normal activities of the occupant or detracting to any extent from the appearance of the cage.

While some of the more salient features, characteristics, and advantages of a device embodying principles of the present invention have been above pointed out, others will become apparent from the following disclosure.

The invention includes these and other features of construction and combinations of parts set forth hereinafter and shown in a preferred form in the drawings, as more particularly indicated by the claims.

On the drawings:

Figure 1 is a top plan view of a base for a bird cage, the cage body having been removed, the base being provided with improvements in the nature of a bathtub and the manner of mounting the same, embodying principles of the present invention.

Figure 2 is a bottom plan view of the base shown in Figure 1.

Figure 3 is an enlarged fragmentary vertical sectional view taken substantially along line III—III of Figure 1, with the drawer removed and with the body mounted in position on the base.

Figure 4 is an enlarged top plan view of the bathtub itself.

As shown on the drawings:

In the structure selected to illustrate an embodiment of the present invention, there is shown a base for a bird cage of the general character of the base set forth more fully in my copending application for Letters Patent entitled "Cage," Serial No. 343,257, filed February 28, 1929, although it is to be understood that the base may be of any desired type and of any configuration.

In this instance, the base includes an outer preferably dome shaped supporting element 5 having a backwardly turned lower margin to provide a rolled edge 6 (Figure 3) upon which the base may rest on any desired object in the event the cage is not suspended from the top thereof. Preferably integral with the dome shaped portion 5, is an upwardly extending annular wall 7, the upper portion of which is bent inwardly, downwardly, and then again inwardly to provide an annular flange 8 upon which a cage body 9 may rest.

The annular wall 7 is provided with a suitable arcuate slot, preferably less than the diameter of the base, through which a drawer 10 (Figure 1) is slidable. This drawer, as more completely shown by the full lines in Figure 1, when in its closed position, completely underlies the cage body 9, since the rim of the drawer is always beneath the flange 8. Of course, when the drawer is moved inwardly to its closed position, it will function as the cage bottom, and obviously it is a simple matter to clean the cage by merely withdrawing the drawer, cleansing it, and then reinserting it.

To provide an adequate rest for the drawer 10, a floor 11 is provided in the base upon which the drawer is slidable. This floor 11 is preferably spaced above the lower edge 6 of the base and secured in position in any desired manner, as, for instance, by brazing, welding, or the like. Preferably adjacent the central portion thereof, the floor is provided with a relatively large aperture 12 adjacent which the floor margin is turned downwardly to provide a depending flange 13 which defines the aperture. A plurality of bayonet slot pins or projections 14 having enlarged heads and relatively small shanks, is secured to the underside of the floor 11 adjacent the flange 13, the pins being preferably in spaced relationship.

To furnish adequate bathing facilities for the occupant of the cage without incurring the expenditure of an undesirable amount of time and labor as outlined hereinabove, a bathtub or bathing receptacle 15 is provided, which is preferably of just sufficient diameter to fit easily over the depending flange 13 on the floor 11. The bathtub, in this instance, is in the nature of a shallow receptacle capable of containing an adequate supply of liquid 16, such as water, and having an open upper end adjacent which an annular flange 17 extends outwardly from and is preferably integral with the body of the bathtub. This flange 17 at spaced intervals therealong is provided with suitable bayonet slots 18 for engagement over the projections 14 depending from the floor 11.

It is thus apparent that by simply slipping the enlarged portions of the bayonet slots 18 over the projections 14 and then slightly rotating the bathtub 15 with respect to the cage base, the tub may be very easily attached to the cage, and by a simple converse operation the tub may be as easily removed from the cage. It will also be noted that the tub is preferably of a less depth than the distance from the floor 11 to the lower edge 6 of the base, so that if it is desired to set the cage upon an object, the base will always be level and the tub substantially invisible; or, if it is desired to suspend the cage from the top thereof, the tub will also be substantially invisible due to its being hidden by the domelike portion 5 of the base.

In operation, the present invention is extremely simple, resulting in a material saving of time and labor. Assuming now that the cage is in use and it is desired to permit the occupant thereof to bathe itself, it is simply necessary to put some water in the bathtub 15 and attach the top to the underside of the floor 11 in the manner previously explained. Then the drawer 10 is removed as indicated by the dotted lines in Figure 1, thereby exposing the tub and rendering the same accessible to the occupant of the cage. While the bird or other animal is bathing, the drawer 10 may be emptied of débris and otherwise cleansed. Then, when the occupant of the cage has finished its bath, the clean drawer may be reinserted and the bathtub removed, if so desired, in the manner explained hereinabove. In other words, the cage occupant may be permitted to bathe and the cage may be cleansed simultaneously and with cooperative action.

It will be noted that the bathtub is attached to an exterior portion of the cage, and then rendered easily accessible to the occupant of the cage from the interior thereof. Of course, in the event the cage base has no drawer therein, and a structure the same as or similar to the floor 11 functions as the bottom of the cage, the bathtub may be left accessible or any suitable device may be used to cover the aperture 12.

It quite frequently happens, especially with birds, that the occupant of the cage is reluctant or afraid to enter the bathtub. Usually, it is found more practical to make bathtubs of glass or some suitably enameled metal, and a bird especially becomes frightened at the slipperiness of the interior of the bathtub. Consequently, it is difficult to persuade the occupant of the cage to enter the bath. To overcome the tendency on the part of the animal, the present bathtub is provided with bird enticing means 19, in this instance, in the form of a plurality of leaves painted upon the inner surface of the bathtub, which acts as a lure for the cage occupant and entices the animal to such an extent that it will overcome its inherent prejudice and immediately enter the bath. Once in the bath, the animal, in most instances, remains until it has cleansed itself.

From the foregoing, it will be apparent that I have provided novel means for providing a caged animal with bathing facilities, the bathtub embodied in this invention being attachable to the cage from the exterior thereof and rendered, also from the exterior of the cage, easily accessible to the occupant within the cage. Moreover, the bathtub is readily attached or removed, and may be left in position as long as desired either with water therein or empty, the tub, when the entrance thereto is covered, being invisible. Furthermore, the bathtub embodied in this invention is rendered highly attractive to the occupant of the cage which will enter the tub more quickly than has been customary heretofore. In addition, the present invention is durable, does not detract from, but in fact enhances the appearance of the cage as a whole, and may be economically manufactured.

I am aware that numerous details of construction may be varied through a wide range without departing from the principles of this invention, and I, therefore, do not purpose limiting the patent granted, otherwise than necessitated by the prior art.

I claim as my invention:

1. In combination, a cage base, a floor in said base above the lower edge thereof and having an aperture therein, a drawer slidable on said floor beneath a cage body, and a liquid container attached to said floor to underlie said aperture, the bottom of said container being sufficiently high to permit said base to rest evenly on an object.

2. In a bird cage, a base, a cage body mountable on said base, a drawer slidable in said base to underlie said body, and a bathtub for the occupant of said cage attached to said base beneath said drawer.

3. As an article of manufacture, a bird cage, comprising a base including a partition having an opening therein, a body on said base, and a bird bath in said base detachably supported directly by the partition and accessible to the bird in the cage only through said opening, said bath being removable through the underside of the base.

4. As an article of manufacture, a bird cage, comprising a base including a partition having an opening therein, a body on said base, a bird bath in said base supported directly by the partition and accessible to the bird in the cage only through said opening, said bath being removable through the underside of the base, and means for detachably connecting said bath to said partition so that said bath may be lowered from the bottom of the cage without the necessity of disconnecting said base from said body.

5. As an article of manufacture, a bird cage, comprising a base including a partition having an opening therein, a body on said base, a bird bath in said base supported directly by the partition and accessible to the bird in the cage only through said opening, said bath being removable through the underside of the base and comprising a flanged pan and means for detachably connecting the flange of said pan to said partition.

6. As an article of manufacture, a bird cage comprising a base, a cage body on said base, a bird bath pan detachably connected to the bottom of the cage and a cover for said bath when it is not in use, said cover being removable from the top of said bath pan to render the bath accessible to the bird in the cage without the necessity of disconnecting said base and body from each other.

7. As an article of manufacture, a bird cage comprising a base, a cage body on said base, a bird bath pan detachably connected to the bottom of the cage and a cover for said bath when it is not in use, said cover being removable from the top of said bath pan to render the bath accessible to the bird in the cage without the necessity of disconnecting said base and body from each other and comprising a false bottom for the cage normally in position over said bath.

In testimony whereof I have hereunto subscribed my name at Chicago, Cook County, Illinois.

CHARLES H. HENNINGS.